United States Patent [19]

Lindsay

[11] Patent Number: 4,522,538
[45] Date of Patent: Jun. 11, 1985

[54] MILLING CUTTER WITH MULTIPLE INDEXABLE CUTTING INSERTS

[76] Inventor: Harold W. Lindsay, 2451 NW. 30th, Portland, Oreg. 97210

[21] Appl. No.: 549,475

[22] Filed: Nov. 7, 1983

[51] Int. Cl.³ .............................................. B26D 1/12
[52] U.S. Cl. .......................................... 407/35; 407/52
[58] Field of Search ......................... 407/52, 43, 70, 35

[56] References Cited

U.S. PATENT DOCUMENTS

| 2,805,467 | 9/1957 | Greenleaf | 407/52 |
| 2,805,469 | 9/1957 | Greenleaf | 407/52 |
| 3,323,194 | 6/1967 | Greenleaf | 407/52 |
| 3,359,612 | 12/1967 | Mina | 407/52 |

FOREIGN PATENT DOCUMENTS

| WO83/02420 | 7/1983 | PCT Int'l Appl. | 407/113 |
| 371322 | 9/1963 | Switzerland | 407/41 |
| 383122 | 12/1967 | Switzerland | 407/38 |
| 1376510 | 12/1934 | United Kingdom | 407/41 |
| 1195085 | 6/1970 | United Kingdom | 407/43 |

*Primary Examiner*—Francis S. Husar
*Assistant Examiner*—William E. Terrell
*Attorney, Agent, or Firm*—Klarquist, Sparkman, Campbell, Leigh & Whinston

[57] ABSTRACT

A milling cutter comprises a body with a rim having an annular seating surface and forming a lip around such surface, a spacer ring having a rim complementary to the seating surface and provided with a plurality of generally radial slots, a cutting insert received in each such slot, a side of the insert being supported by the seating surface, the lip preventing radially outward movement of the insert, and a retaining ring having a surface adapted to engage a second side of the insert to clamp it against the seating surface of the body.

3 Claims, 5 Drawing Figures

MILLING CUTTER WITH MULTIPLE INDEXABLE CUTTING INSERTS

BACKGROUND OF THE INVENTION

This invention relates to rotary milling cutters and more particularly, to cutters having clamped indexable cutting inserts.

Milling cutters have been made to use clamped indexable cutting inserts. Such inserts are of polygonal cross-section, but may also be round, and have their sides ground perpendicular to their longitudinal axes to provide cutting edges. When one of the cutting edges becomes dull, a fresh cutting edge can be brought into cutting position merely by indexing the insert on its axis and by turning the insert end for end until each side has been used.

Prior milling cutters have generally required a holding member for each individual insert. Proper location of the inserts has generally required the use of adjusting screws for each such holder. The resulting cutters have thus been complex and expensive.

Accordingly, it is a principal object of the present invention to provide a milling cutter suitable for use with indexable cutting inserts and which will eliminate the need for a holding member for each such insert.

A further object of the present invention is to provide such a cutter that can use a greater number of cutting inserts than has heretofore been possible.

A still further object of the present invention is to provide such a cutter having a single locating plate and a single retaining plate irrespective of the number of cutting inserts used.

A still further object of the present invention is to provide such a cutter that can be used at extremely high cutting speeds.

SUMMARY OF THE INVENTION

The milling cutter of the instant invention achieves the foregoing and other objects. It comprises a body having an annular surface concentric with the axis of the cutter and located inwardly from one end of the body. The body has a rim extending radially outwardly of the interior surface. There is an annular seating surface formed on the rim. The rim forms a lip around the seating surface.

An annular spacer ring has a first axially inwardly extending annular exterior surface and a second exterior annular surface adapted to contact the annular surface of the body. The spacer ring also has a rim which has a surface generally complementary to the annular seating surface of the body rim. The spacer ring rim has a plurality of generally radial slots extending completely therethrough.

A cutting insert is received in each of the slots in the spacer ring rim such that the insert is supported by the annular seating surface of the body rim. The lip on the body rim is adapted to prevent radially outward movement of the insert.

A retaining ring has an exterior surface generally complementary to the first annular exterior surface of the spacer ring. A portion of the exterior surface of the retaining ring is adapted to engage a side of the cutting insert, remote from the side supported by the annular seating surface, to clamp the insert against the annular seating surface of the body rim.

In one embodiment, the lip and the annular seating surface of the body rim are L-shaped in cross-section, thus to provide for square cutting inserts. A square cutting insert thus has one side supported by the annular seating surface of the body rim and is prevented from radially outward movement by the lip on the body rim which engages and supports a second side of the insert.

The retaining ring is desirably provided with an annular groove in the portion of its exterior surface adapted to engage the remote side of the cutting insert. An elastomeric sealing ring, for example a neoprene O-ring, is disposed in the groove such that the ring engages the remote side resiliently to clamp the insert against the annular seating surface of the body rim.

DESCRIPTION OF THE PREFERRED EMBODIMENT

Figure 1:
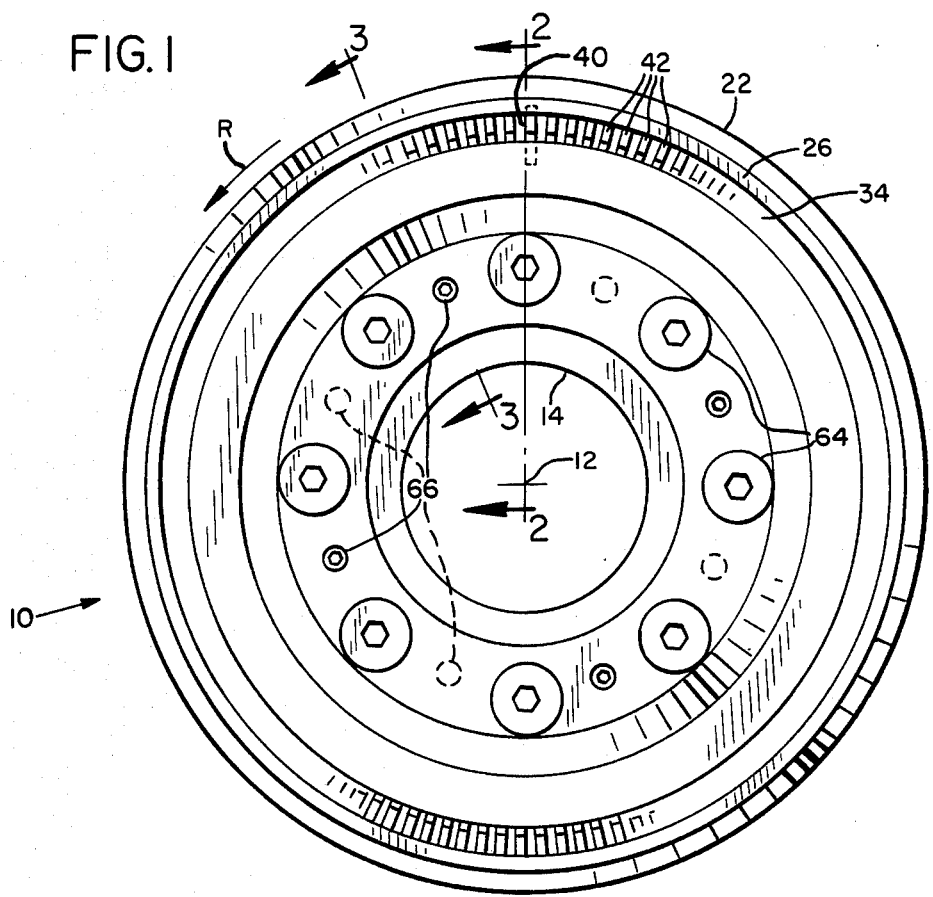
FIG. 1 is a top plan view of my milling cutter.
Figure 2:
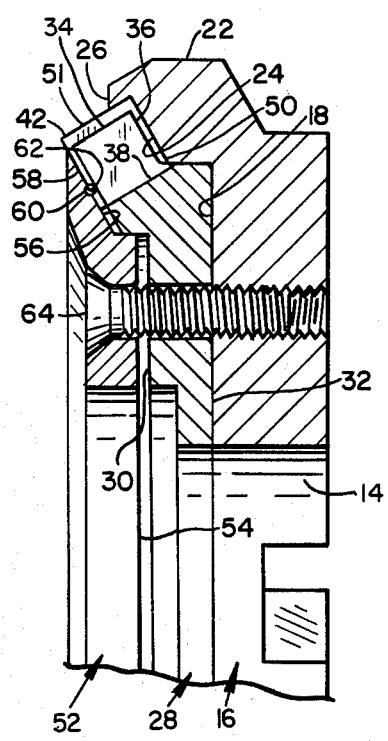
FIG. 2 is a sectional view on line 2—2 of FIG. 1.
Figure 3:
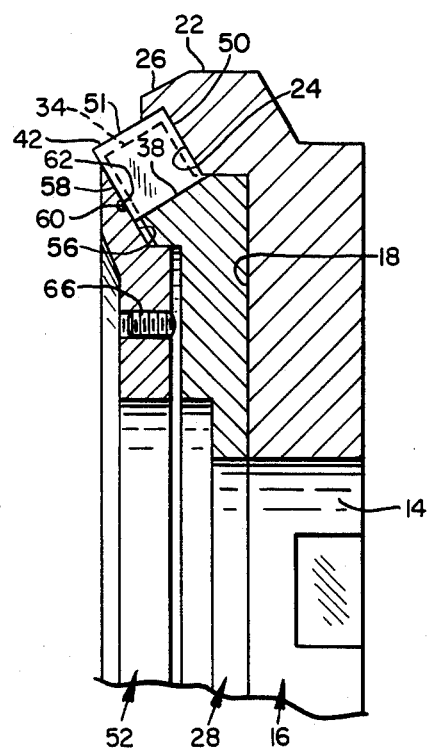
FIG. 3 is a sectional view on line 3—3 of FIG. 1.

Referring to the drawings, my milling cutter 10 is provided at its center or axis 12 with an arbor hole 14 by which the cutter is fastened to a spindle (not shown). The cutter 10 comprises a body 16 having an annular surface 18 which is concentric with the axis 12 and is located inwardly from the end 20 which is remote from the spindle. (In the context of this invention "inwardly" means towards the interior of an element. Correspondingly, "outwardly" means towards the exterior of an element.)

The body 16 has a rim 22 extending radially outwardly of the surface 18. An annular seating surface 24 is formed on the rim. The rim includes a lip 26. The surface 24 and the lip 26 produce an L-shaped cross section.

A spacer ring 28 is provided with a first annular surface 30 and a second annular surface 32 parallel to the surface 30 and adapted to contact the annular surface 18 of the body 16. Thus the spacer ring 28 is adapted to be seated with its surface 32 in contact with surface 18 of the body 16, as shown.

The spacer ring 28 is also provided with a rim 34, which has a surface 36 generally congruent to the annular seating surface 24 of the body rim 22. Thus, when the spacer ring 28 is seated in contact with the annular surface 18 of the body 16, the surface 36 of the rim 34 is adjacent, but not in contact with the surface 24 of the rim 22, the rim 34 generally being received within the L-shaped cross-section formed by the surface 24 and the lip 26.

The spacer ring rim 34 is provided with a plurality of generally radial slots 38 extending completely through it. In a preferred embodiment the slots are cut such that the leading face 40 of a cutting insert 42 is on a diameter of the cutter 10. See FIG. 1, in which the direction of rotation is shown by the arrow R.

A cutting insert 42 is received in each slot 38. Such cutting inserts are typically made of carbide and have end faces 44 ground perpendicular to their length. The intersection of the insert faces 44 with the sides 46 provide as many cutting edges 48 as there are sides to the insert. The cutting edges 48 takes the cutting thrust. By indexing the inserts about their longitudinal axes, each of the cutting edges 48 may successively be brought into cutting position.

As shown in the drawings, each insert 42 is received within a slot 38 in the rim 34 of the spacer ring 28. A first side 50 is supported by the annular seating surface 24 of the rim 22. In the case of square inserts, the lip 26 prevents radially outward movement of the insert by engaging and supporting a second side 51, retaining the insert within the rim 22.

A retaining ring 52 has an exterior surface 54 generally congruent to the surface 30 of the spacer ring 28 such that the retaining ring 52 and spacer ring 28 also fit together. A portion 56 of the surface 54 of the ring 52 is positioned generally adjacent another side 58 of the inserts 42 to clamp the inserts 42 against the annular seating surface 24 and lip 26.

The portion 56 of the surface 54 of the ring 52 is provided with an annular groove 60 in which is disposed an elastomeric sealing ring 62, which is preferably a round cross-section neoprene O-ring. When the retaining ring 52 is in position adjacent the spacer ring 28, the ring 62 engages the sides 58 of the inserts 42 resiliently to clamp them against the annular seating surface 24 and lip 26.

The body 16, spacer ring 28 and retaining ring 52 are assembled using countersunk flathead five-sixteenths inch diameter bolts 64 as shown. In order to facilitate disassembly, each of the retaining ring 52 and spacer ring 28 is provided with jack screws 66 to separate each such plate from the adjacent one.

A six inch diameter cutter formed in accordance with the invention can accommodate ninety carbide inserts 42, that is, five such inserts per inch circumferentially of the cutter. All such inserts 42 are retained by the single retaining ring 52, being positioned circumferentially by the slots 38 in the spacer ring 28. Such slots are preferably made with 0.0005 inch clearance which is sufficient to provide circumferential support for the inserts. Uniform axial projection of the inserts is achieved by the accurate machining of the surface 24. Separate holders for each insert and/or adjusting screws are unnecessary.

I have thus provided a simple economical milling cutter adapted to handle a large number of cutting inserts without individual holders or clamps and without any adjusting screws. Only the retaining ring 52 and the spacer ring 28 are needed to retain the inserts in position. My cutter may be operated at speeds up to one hundred eighty inches per minute.

Figure 5:
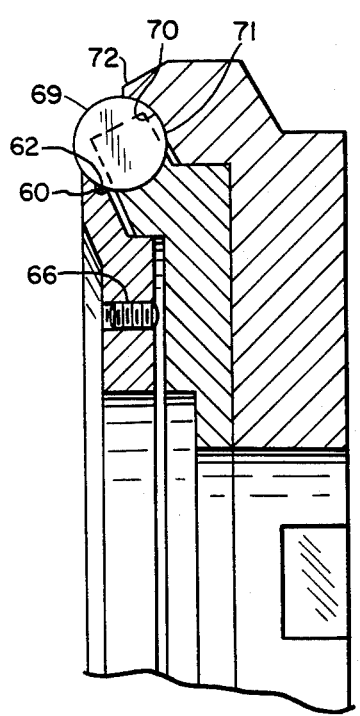
FIG. 5 is a sectional view similar to FIG. 2 of an alternate embodiment.
Figure 4:
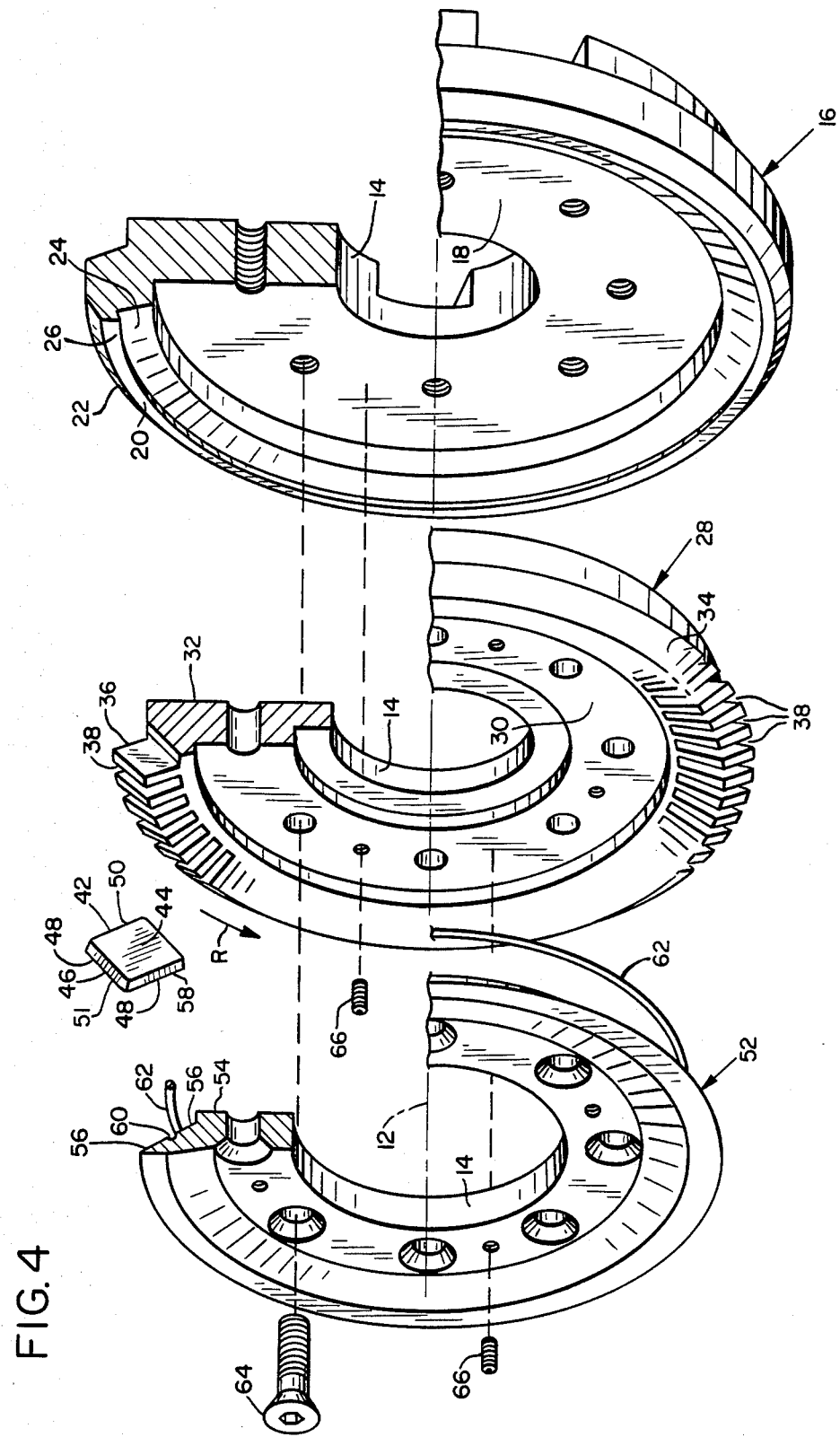
FIG. 4 is an exploded perspective view with parts broken away of the cutter of FIG. 1.

Although the invention has been illustrated using square inserts 42, circular inserts 69 may also be used. See FIG. 5. In this embodiment an annular seating surface 70 is formed on the rim. The rim includes a lip 72. The surface 70 and the lip 72 produce a round cross-section 71. The assembly retains the circular inserts 69 against radially outward movement.

I claim:

1. A milling cutter comprising,
    a body having an annular surface concentric with the axis of the cutter and located inwardly from one end of the body, the body having a rim extending radially outwardly of the annular surface, the rim having an annular seating surface formed thereon, the rim forming a lip around the seating surface;
    a spacer ring having a first annular exterior surface and a second annular exterior surface parallel to the first surface and adapted to contact the annular surface of the body, the spacer ring being seated in contact with the body, the spacer ring having a rim, the spacer ring rim having a surface generally congruent to the annular seating surface of the body rim such that said last-named surface is adjacent but not in contact with the annular seating surface of the body rim when the spacer ring is seated in contact with the body, the spacer ring rim having a plurality of generally radial slots extending completely therethrough;
    a cutting insert received in each of the slots in the spacer ring rim, the cutting insert having a plurality of sides formed between parallel faces, a first side of the cutting insert being supported by the annular seating surface of the body rim, the lip thereof being adapted to prevent radially outward movement of the insert;
    a retaining ring having an exterior surface generally congruent to the first annular surface of the spacer ring, a portion of the exterior of the exterior surface of the retaining ring being adapted to engage a second side of the cutting insert; and
    means clamping the retaining ring, the spacer ring and the body together, whereby the insert-engaging portion of the exterior surface of the retaining ring clamps the insert against the annular seating surface of the body rim.

2. The milling cutter of claim 1, in which the annular seating surface of the body rim and the lip produce an L-shaped cross-section and the cutting insert is a square insert.

3. The milling cutter of claim 1, further comprising
    an annular groove in the portion of the exterior surface of the retaining ring adapted to engage the second side of the cutting insert; and
    an elastomeric sealing ring disposed in the groove, the elastomeric sealing ring engaging the second side of the cutting insert resiliently to clamp the insert against the annular seating surface of the body rim.

* * * * *

UNITED STATES PATENT AND TRADEMARK OFFICE
CERTIFICATE OF CORRECTION

PATENT NO. : 4,522,538
DATED : June 11, 1985
INVENTOR(S) : Harold W. Lindsay

It is certified that error appears in the above-identified patent and that said Letters Patent is hereby corrected as shown below:

Column 2, line 67, "edges" should be --edge--; and

Column 4, line 33 (claim 1), "of the exterior" (second occurrence) should be deleted.

Signed and Sealed this

Seventeenth Day of September 1985

[SEAL]

Attest:

DONALD J. QUIGG

Attesting Officer

Commissioner of Patents and
Trademarks—Designate